US012604253B2

(12) United States Patent
Chandramouli et al.

(10) Patent No.: US 12,604,253 B2
(45) Date of Patent: Apr. 14, 2026

(54) ANALYTICS AND PATH SELECTION

(71) Applicant: NOKIA SOLUTIONS AND NETWORKS OY, Espoo (FI)

(72) Inventors: Devaki Chandramouli, Plano, TX (US); Bruno Landais, Pleumeur Bodou (FR); Saurabh Khare, Bangalore (IN)

(73) Assignee: Nokia Solutions and Networks OY, Espoo (FI)

( * ) Notice: Subject to any disclaimer, the term of this patent is extended or adjusted under 35 U.S.C. 154(b) by 486 days.

(21) Appl. No.: 18/023,253

(22) PCT Filed: Aug. 31, 2020

(86) PCT No.: PCT/US2020/048746
§ 371 (c)(1),
(2) Date: Feb. 24, 2023

(87) PCT Pub. No.: WO2022/046106
PCT Pub. Date: Mar. 3, 2022

(65) Prior Publication Data
US 2023/0276339 A1 Aug. 31, 2023

(51) Int. Cl.
*H04W 40/12* (2009.01)
*H04W 40/24* (2009.01)

(52) U.S. Cl.
CPC ......... *H04W 40/12* (2013.01); *H04W 40/246* (2013.01)

(58) Field of Classification Search
CPC ...... H04W 40/12; H04W 40/246; H04L 45/42
See application file for complete search history.

(56) References Cited

U.S. PATENT DOCUMENTS

| | | | |
|---|---|---|---|
| 9,736,046 B1 | 8/2017 | Jain et al. | |
| 10,749,785 B1 * | 8/2020 | Thangavel | ............ H04L 43/106 |
| 2003/0103465 A1 | 6/2003 | Counterman | |
| 2012/0039262 A1 | 2/2012 | Walsh | |
| 2014/0321273 A1 * | 10/2014 | Morrill | ............... H04L 41/0668 370/230 |
| 2016/0353367 A1 | 12/2016 | Vrzic et al. | |
| 2017/0289270 A1 * | 10/2017 | Li | ........................ H04W 64/006 |
| 2019/0150150 A1 | 5/2019 | Calin et al. | |
| 2020/0036754 A1 * | 1/2020 | Livanos | ................ H04W 48/16 |
| 2022/0322202 A1 * | 10/2022 | Li | ......................... H04M 15/93 |

OTHER PUBLICATIONS

International Search Report and Written Opinion corresponding to International Patent Application No. PCT/US2020/048746, dated Dec. 3, 2020.

(Continued)

*Primary Examiner* — Shawn D Miller

(74) *Attorney, Agent, or Firm* — Lippes Mathias LLP

(57) ABSTRACT

There is provided an apparatus comprising means for receiving, at a network function from a requester of path selection information in a communications network, a request for path selection information between a first network entity and a second network entity in the communications network, determining a path between a first network entity and a second network entity and providing an indication to the requester of path selection information of the determined path.

23 Claims, 9 Drawing Sheets

(56) References Cited

OTHER PUBLICATIONS

Hao et al., "Path computation for IP network optimization," In: Nokia, Jun. 16, 2015, Retrived on Nov. 2, 2020 from <https://www. nokia.com/blog/path-computation-ip-network-optimization/>, 8 pages.
"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.
Extended European Search Report received for corresponding European Patent Application No. 20951811.7, dated Apr. 29, 2024, 12 pages.

* cited by examiner 215
211b
200
214
213
212
211a

ANALYTICS AND PATH SELECTION

FIELD

The present application relates to a method, apparatus, system and computer program and in particular but not exclusively to performing path selection based on network analytics.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for receiving, at a network function from a requester of path selection information in a communications network, a request for path selection information between a first network entity and a second network entity in the communications network, determining a path between a first network entity and a second network entity and providing an indication to the requester of path selection information of the determined path.

The first network entity may comprise a network function service consumer and the second network entity may comprise a network function service producer. The first network entity may comprise a network function service producer and the second network entity may comprise a network function service consumer.

The network function may be a network data analytics function.

The requester of path selection information may be one of a service communication proxy, a security edge protection proxy, a network function, a network repository function and an operations and administration manager.

The apparatus may comprise means for obtaining, from at least one other network entity in the communications network, statistics relating to network performance, wherein the path is determined based on the statistics relating to network performance.

The request may comprise one or more of a public land mobile network identifier associated with at least one of the first and second network entities, network function information associated with at least one of the first and second network entities and information associated with at least one proxy in communication with the requester of path selection information.

The statistics relating to network performance may comprise at least one of a number of discovery and/or selection events performed by said at least one other network entity in the communications network, a number of reselection events performed by said at least one other network entity in the communications network, a number of times said at least one other network entity was unable to fulfil a service request for a given network function service producer, error information received or generated by said at least one other network entity in the communications network, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The determined path may be associated with a timing window, and the apparatus may comprise means for providing an indication of the timing window to the requester of path selection information.

The apparatus may comprise means for determining a change in network behaviour, determining an updated path between the first network entity and the second network entity and providing an indication to the requester of path selection information of updated path selection information.

The indication of the path may be further provided to at least one of a network function, a network repository function, an operations and administration manager, a service communication proxy and a security edge protection proxy.

Said at least one other network entity in the communications network may be one of a service communication proxy, a security edge protection proxy, a network function and a network repository function.

In a second aspect there is provided an apparatus comprise means for providing, from a requester of path selection information in a communications network to a network function, a request for path selection information between a first network entity and a second network entity in the communications network, receiving, from the network function, an indication of a path between the first network entity and the second network entity and routing service requests between the first network entity and the second network entity based on the received indication.

The first network entity may comprise a network function service consumer, and the second network entity may comprise a network function service producer. The first network entity may comprise a network function service producer, and the second network entity may comprise a network function service consumer.

The network function may be a network data analytics function.

The requester of path selection information may be one of a service communication proxy, a security edge protection proxy, a network function, a network repository function and an operations and administration manager.

The request may comprise one or more of a public land mobile network identifier associated with at least one of the first and second network entities, network function information associated with at least one of the first and second network entities and information associated with at least one proxy in communication with the requester of path selection information.

The determined path may be associated with a timing window, and the apparatus may comprise means for receiving an indication of the timing window from the network function.

The apparatus may comprise means for receiving, from the analytics function, an indication of updated path selection information between the first network entity and the second network entity and routing service requests between the first network entity and the second network entity based on the updated path selection information.

In a third aspect there is provided an apparatus comprising means for obtaining, from at least one network entity in the communications network, statistics relating to network performance and providing the statistics or information derived from the statistics to at least one further network entity in the communications network.

The statistics relating to network performance may comprise at least one of a number of discovery and/or selection events performed by said at least one network entity in the communications network, a number of reselection events performed by said at least one network entity in the communications network, a number of times said at least one network entity in the communications network was unable to fulfil a service request for a given network function service producer, error information received or generated by said at least one network entity, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The said at least one network entity may comprise at least one of a network function, a network repository function, an operations and administration manager, a service communication proxy and a security edge protection proxy.

The at least one further network entity may comprise at least one of a network function, a network repository function and an operations and administration manager.

The apparatus may comprise means for receiving a request for the statistics or information derived from the statistics relating to network performance; and wherein the providing the statistics or information derived from the statistics is performed responsive to the receiving.

In a fourth aspect, there is provided an apparatus comprising means for receiving, from a network function, statistics or information derived from statistics relating to network performance; and at least one of: performing a network entity discovery process based, at least in part, on the received statistics relating to network performance, determining network reconfiguration actions based on the received statistics relating to network performance, and selecting a network function service producer based on the received statistics relating to network performance.

The apparatus may comprise means for receiving at at least one entity in a communications network, a request from a network function to provide the statistics relating to network performance, or a request to subscribe to be notified about changes of statistics relating to network performance and providing to the network function statistics relating to network performance in the response or notifying the network function about changes of statistics relating to network performance in subsequent notifications.

The statistics relating to network performance may comprises at least one of a number of discovery and/or selection events performed by said at least one entity in the communications network, a number of reselection events performed by said at least one entity in the communications network, a number of times said at least one entity in the communications network was unable to fulfil a service request for a given network function service producer, error information received or generated by said at least one entity in the communications network, load and/or overload metrics of network function service producers and at least one of average, minimum, and maximum response times.

The statistics relating to network performance may be defined per at least one of a network function service instance, a network function service set, a network function instance, a network function set, a network function type, public land mobile network and service mesh domain.

The said at least one network entity in the communications network may comprise at least one of a network function, a network repository function, a service communication proxy and a security edge protection proxy.

The network function may be a network data analytics function.

In a fifth aspect there is provided a method comprising receiving, at a network function from a requester of path selection information in a communications network, a request for path selection information between a first network entity and a second network entity in the communications network, determining a path between a first network entity and a second network entity and providing an indication to the requester of path selection information of the determined path.

The first network entity may comprise a network function service consumer and the second network entity may comprise a network function service producer. The first network entity may comprise a network function service producer and the second network entity may comprise a network function service consumer.

The network function may be a network data analytics function.

The requester of path selection information may be one of a service communication proxy, a security edge protection proxy, a network function, a network repository function and an operations and administration manager.

The method may comprise obtaining, from at least one other network entity in the communications network, statistics relating to network performance, wherein the path is determined based on the statistics relating to network performance.

The request may comprise one or more of a public land mobile network identifier associated with at least one of the first and second network entities, network function information associated with at least one of the first and second network entities and information associated with at least one proxy in communication with the requester of path selection information.

The statistics relating to network performance may comprise at least one of a number of discovery and/or selection events performed by said at least one other network entity in the communications network, a number of reselection events performed by said at least one other network entity in the communications network, a number of times said at least one other network entity was unable to fulfil a service request for a given network function service producer, error information received or generated by said at least one other network entity in the communications network, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The determined path may be associated with a timing window, and the method may comprise providing an indication of the timing window to the requester of path selection information.

The method may comprise determining a change in network behaviour, determining an updated path between the first network entity and the second network entity and providing an indication to the requester of path selection information of updated path selection information.

The indication of the path may be further provided to at least one of a network function, a network repository function, an operations and administration manager, a service communication proxy and a security edge protection proxy.

Said at least one other network entity in the communications network may be one of a service communication proxy, a security edge protection proxy, a network function and a network repository function.

In a sixth aspect there is provided a method comprising providing, from a requester of path selection information in a communications network to a network function, a request for path selection information between a first network entity and a second network entity in the communications network, receiving, from the network function, an indication of a path between the first network entity and the second network entity and routing service requests between the first network entity and the second network entity based on the received indication.

The first network entity may comprise a network function service consumer, and the second network entity may comprise a network function service producer. The first network entity may comprise a network function service producer, and the second network entity may comprise a network function service consumer.

The network function may be a network data analytics function.

The requester of path selection information may be one of a service communication proxy, a security edge protection proxy, a network function, a network repository function and an operations and administration manager.

The request may comprise one or more of a public land mobile network identifier associated with at least one of the first and second network entities, network function information associated with at least one of the first and second network entities and information associated with at least one proxy in communication with the requester of path selection information.

The determined path may be associated with a timing window, and the apparatus may comprise means for receiving an indication of the timing window from the network function.

The method may comprise receiving, from the analytics function, an indication of updated path selection information between the first network entity and the second network entity and routing service requests between the first network entity and the second network entity based on the updated path selection information.

In a seventh aspect there is provided a method comprising obtaining, from at least one network entity in the communications network, statistics relating to network performance and providing the statistics or information derived from the statistics to at least one further network entity in the communications network.

The statistics relating to network performance may comprise at least one of a number of discovery and/or selection events performed by said at least one network entity in the communications network, a number of reselection events performed by said at least one network entity in the communications network, a number of times said at least one network entity in the communications network was unable to fulfil a service request for a given network function service producer, error information received or generated by said at least one network entity, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The said at least one network entity may comprises at least one of a network function, a network repository function, an operations and administration manager, a service communication proxy and a security edge protection proxy.

The at least one further network entity may comprise at least one of a network function, a network repository function and an operations and administration manager.

The method may comprise receiving a request for the statistics or information derived from the statistics relating to network performance; and wherein the providing the statistics or information derived from the statistics is performed responsive to the receiving.

In an eighth aspect, there is provided a method comprise receiving, from a network function, statistics or information derived from statistics relating to network performance; and at least one of: performing a network entity discovery process based, at least in part, on the received statistics relating to network performance, determining network reconfiguration actions based on the received statistics relating to network performance, and selecting a network function service producer based on the received statistics relating to network performance.

The method may comprise receiving at at least one entity in a communications network, a request from a network function to provide the statistics relating to network performance, or a request to subscribe to be notified about changes of statistics relating to network performance and providing to the network function statistics relating to network performance in the response or notifying the network function about changes of statistics relating to network performance in subsequent notifications.

The statistics relating to network performance may comprises at least one of a number of discovery and/or selection events performed by said at least one entity in the communications network, a number of reselection events performed by said at least one entity in the communications network, a number of times said at least one entity in the communications network was unable to fulfil a service request for a given network function service producer, error information received or generated by said at least one entity in the communications network, load and/or overload metrics of network function service producers and at least one of average, minimum, and maximum response times.

The statistics relating to network performance may be defined per at least one of a network function service instance, a network function service set, a network function instance, a network function set, a network function type, public land mobile network and service mesh domain.

The said at least one network entity in the communications network may comprise at least one of a network function, a network repository function, a service communication proxy and a security edge protection proxy.

The network function may be a network data analytics function.

In a ninth aspect there is provided an apparatus comprising: at least one processor and at least one memory including a computer program code, the at least one memory and computer program code configured to, with the at least one processor, cause the apparatus at least to receive, at a network function from a requester of path selection information in a communications network, a request for path selection information between a first network entity and a second network entity in the communications network, determine a path between a first network entity and a second network entity and provide an indication to the requester of path selection information of the determined path.

The first network entity may comprise a network function service consumer and the second network entity may comprise a network function service producer. The first network entity may comprise a network function service producer and the second network entity may comprise a network function service consumer.

The network function may be a network data analytics function.

The requester of path selection information may be one of a service communication proxy, a security edge protection proxy, a network function, a network repository function and an operations and administration manager.

The apparatus may be configured to obtain, from at least one other network entity in the communications network, statistics relating to network performance, wherein the path is determined based on the statistics relating to network performance.

The request may comprise one or more of a public land mobile network identifier associated with at least one of the first and second network entities, network function information associated with at least one of the first and second network entities and information associated with at least one proxy in communication with the requester of path selection information.

The statistics relating to network performance may comprise at least one of a number of discovery and/or selection events performed by said at least one other network entity in the communications network, a number of reselection events performed by said at least one other network entity in the communications network, a number of times said at least one other network entity was unable to fulfil a service request for a given network function service producer, error information received or generated by said at least one other network entity in the communications network, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The determined path may be associated with a timing window, and the apparatus may be configured to provide an indication of the timing window to the requester of path selection information.

The apparatus may be configured to determine a change in network behaviour, determine an updated path between the first network entity and the second network entity and provide an indication to the requester of path selection information of updated path selection information.

The indication of the path may be further provided to at least one of a network function, a network repository function, an operations and administration manager, a service communication proxy and a security edge protection proxy.

Said at least one other network entity in the communications network may be one of a service communication proxy, a security edge protection proxy, a network function and a network repository function.

In a tenth aspect there is provided an apparatus comprising: at least one processor and at least one memory including a computer program code, the at least one memory and computer program code configured to, with the at least one processor, cause the apparatus at least to: provide, from a requester of path selection information in a communications network to a network function, a request for path selection information between a first network entity and a second network entity in the communications network, receive, from the network function, an indication of a path between the first network entity and the second network entity and route service requests between the first network entity and the second network entity based on the received indication.

The first network entity may comprise a network function service consumer, and the second network entity may comprise a network function service producer. The first network entity may comprise a network function service producer, and the second network entity may comprise a network function service consumer.

The network function may be a network data analytics function.

The requester of path selection information may be one of a service communication proxy, a security edge protection proxy, a network function, a network repository function and an operations and administration manager.

The request may comprise one or more of a public land mobile network identifier associated with at least one of the first and second network entities, network function information associated with at least one of the first and second network entities and information associated with at least one proxy in communication with the requester of path selection information.

The determined path may be associated with a timing window, and the apparatus may be configured to receive an indication of the timing window from the network function.

The apparatus may be configured to receive, from the analytics function, an indication of updated path selection information between the first network entity and the second network entity and route service requests between the first network entity and the second network entity based on the updated path selection information.

In an eleventh aspect there is provided an apparatus comprising: at least one processor and at least one memory including a computer program code, the at least one memory and computer program code configured to, with the at least one processor, cause the apparatus at least to obtain, from at least one network entity in the communications network, statistics relating to network performance and provide the statistics or information derived from the statistics to at least one further network entity in the communications network.

The statistics relating to network performance may comprise at least one of a number of discovery and/or selection events performed by said at least one network entity in the communications network, a number of reselection events performed by said at least one network entity in the communications network, a number of times said at least one network entity in the communications network was unable to fulfil a service request for a given network function service producer, error information received or generated by said at least one network entity, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The said at least one network entity may comprise at least one of a network function, a network repository function, an operations and administration manager, a service communication proxy and a security edge protection proxy.

The at least one further network entity may comprise at least one of a network function, a network repository function and an operations and administration manager.

The apparatus may be configured to receive a request for the statistics or information derived from the statistics relating to network performance; and wherein the providing the statistics or information derived from the statistics is performed responsive to the receiving.

In a twelfth aspect, there is provided an apparatus comprising: at least one processor and at least one memory including a computer program code, the at least one memory and computer program code configured to, with the at least one processor, cause the apparatus at least to: receive, from a network function, statistics or information derived from statistics relating to network performance; and at least one of: perform a network entity discovery process based, at least in part, on the received statistics relating to network performance, determine network reconfiguration actions based on the received statistics relating to network performance, and select a network function service producer based on the received statistics relating to network performance.

The apparatus may be configured to receive at at least one entity in a communications network, a request from a network function to provide the statistics relating to network performance, or a request to subscribe to be notified about changes of statistics relating to network performance and provide to the network function statistics relating to network performance in the response or notify the network function about changes of statistics relating to network performance in subsequent notifications.

The statistics relating to network performance may comprises at least one of a number of discovery and/or selection events performed by said at least one entity in the communications network, a number of reselection events performed by said at least one entity in the communications network, a number of times said at least one entity in the communications network was unable to fulfil a service request for a given network function service producer, error information received or generated by said at least one entity in the communications network, load and/or overload metrics of network function service producers and at least one of average, minimum, and maximum response times.

The statistics relating to network performance may be defined per at least one of a network function service instance, a network function service set, a network function instance, a network function set, a network function type, public land mobile network and service mesh domain.

The said at least one network entity in the communications network may comprise at least one of a network function, a network repository function, a service communication proxy and a security edge protection proxy.

The network function may be a network data analytics function.

In a thirteenth aspect there is provided a computer readable medium comprising program instructions for causing an apparatus to perform at least the following receiving, at a network function from a requester of path selection information in a communications network, a request for path selection information between a first network entity and a second network entity in the communications network, determining a path between a first network entity and a second network entity and providing an indication to the requester of path selection information of the determined path.

The first network entity may comprise a network function service consumer and the second network entity may comprise a network function service producer. The first network entity may comprise a network function service producer and the second network entity may comprise a network function service consumer.

The network function may be a network data analytics function.

The requester of path selection information may be one of a service communication proxy, a security edge protection proxy, a network function, a network repository function and an operations and administration manager.

The apparatus may be caused to perform obtaining, from at least one other network entity in the communications network, statistics relating to network performance, wherein the path is determined based on the statistics relating to network performance.

The request may comprise one or more of a public land mobile network identifier associated with at least one of the first and second network entities, network function information associated with at least one of the first and second network entities and information associated with at least one proxy in communication with the requester of path selection information.

The statistics relating to network performance may comprise at least one of a number of discovery and/or selection events performed by said at least one other network entity in the communications network, a number of reselection events performed by said at least one other network entity in the communications network, a number of times said at least one other network entity was unable to fulfil a service request for a given network function service producer, error information received or generated by said at least one other network entity in the communications network, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The determined path may be associated with a timing window, and the apparatus may be caused to perform providing an indication of the timing window to the requester of path selection information.

The apparatus may be caused to perform determining a change in network behaviour, determining an updated path between the first network entity and the second network entity and providing an indication to the requester of path selection information of updated path selection information.

The indication of the path may be further provided to at least one of a network function, a network repository function, an operations and administration manager, a service communication proxy and a security edge protection proxy.

Said at least one other network entity in the communications network may be one of a service communication proxy, a security edge protection proxy, a network function and a network repository function.

In a fourteenth aspect there is provided a computer readable medium comprising program instructions for causing an apparatus to perform at least the following providing, from a requester of path selection information in a communications network to a network function, a request for path selection information between a first network entity and a second network entity in the communications network, receiving, from the network function, an indication of a path between the first network entity and the second network entity and routing service requests between the first network entity and the second network entity based on the received indication.

The first network entity may comprise a network function service consumer, and the second network entity may comprise a network function service producer. The first network entity may comprise a network function service producer, and the second network entity may comprise a network function service consumer.

The network function may be a network data analytics function.

The requester of path selection information may be one of a service communication proxy, a security edge protection proxy, a network function, a network repository function and an operations and administration manager.

The request may comprise one or more of a public land mobile network identifier associated with at least one of the first and second network entities, network function information associated with at least one of the first and second network entities and information associated with at least one proxy in communication with the requester of path selection information.

The determined path may be associated with a timing window, and the apparatus may be caused to perform receiving an indication of the timing window from the network function.

The apparatus may be caused to perform receiving, from the analytics function, an indication of updated path selection information between the first network entity and the second network entity and routing service requests between the first network entity and the second network entity based on the updated path selection information.

In a fifteenth aspect there is provided a computer readable medium comprising program instructions for causing an apparatus to perform at least the following obtaining, from at least one network entity in the communications network, statistics relating to network performance and providing the statistics or information derived from the statistics to at least one further network entity in the communications network.

The statistics relating to network performance may comprise at least one of a number of discovery and/or selection events performed by said at least one network entity in the communications network, a number of reselection events performed by said at least one network entity in the communications network, a number of times said at least one network entity in the communications network was unable to fulfil a service request for a given network function service producer, error information received or generated by said at least one network entity, load and/or overload metrics of network function service producers and at least one of average, minimum, and maximum response times.

The statistics relating to network performance may be obtained per at least one of a network function service instance, a network function service set, a network function instance, a network function set, a network function type, public land mobile network and service mesh domain.

The said at least one network entity may comprise at least one of a network function, a network repository function, an operations and administration manager, a service communication proxy and a security edge protection proxy.

The at least one further network entity may comprise at least one of a network function, a network repository function and an operations and administration manager.

The apparatus may be caused to perform receiving a request for the statistics or information derived from the statistics relating to network performance; and wherein the providing the statistics or information derived from the statistics is performed responsive to the receiving.

In a sixteenth aspect, there is provided a computer readable medium comprising program instructions for causing an apparatus to perform at least the following receiving, from a network function, statistics or information derived from statistics relating to network performance; and at least one of: performing a network entity discovery process based, at least in part, on the received statistics relating to network performance, determining network reconfiguration actions based on the received statistics relating to network performance, and selecting a network function service producer based on the received statistics relating to network performance.

The apparatus may be caused to perform receiving at at least one entity in a communications network, a request from a network function to provide the statistics relating to network performance, or a request to subscribe to be notified about changes of statistics relating to network performance and providing to the network function statistics relating to network performance in the response or notifying the network function about changes of statistics relating to network performance in subsequent notifications.

The statistics relating to network performance may comprises at least one of a number of discovery and/or selection events performed by said at least one entity in the communications network, a number of reselection events performed by said at least one entity in the communications network, a number of times said at least one entity in the communications network was unable to fulfil a service request for a given network function service producer, error information received or generated by said at least one entity in the communications network, load and/or overload metrics of network function service producers and at least one of average, minimum, and maximum response times.

The statistics relating to network performance may be defined per at least one of a network function service instance, a network function service set, a network function instance, a network function set, a network function type, public land mobile network and service mesh domain.

The said at least one network entity in the communications network may comprise at least one of a network function, a network repository function, a service communication proxy and a security edge protection proxy.

The network function may be a network data analytics function.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

14

Figure 1:
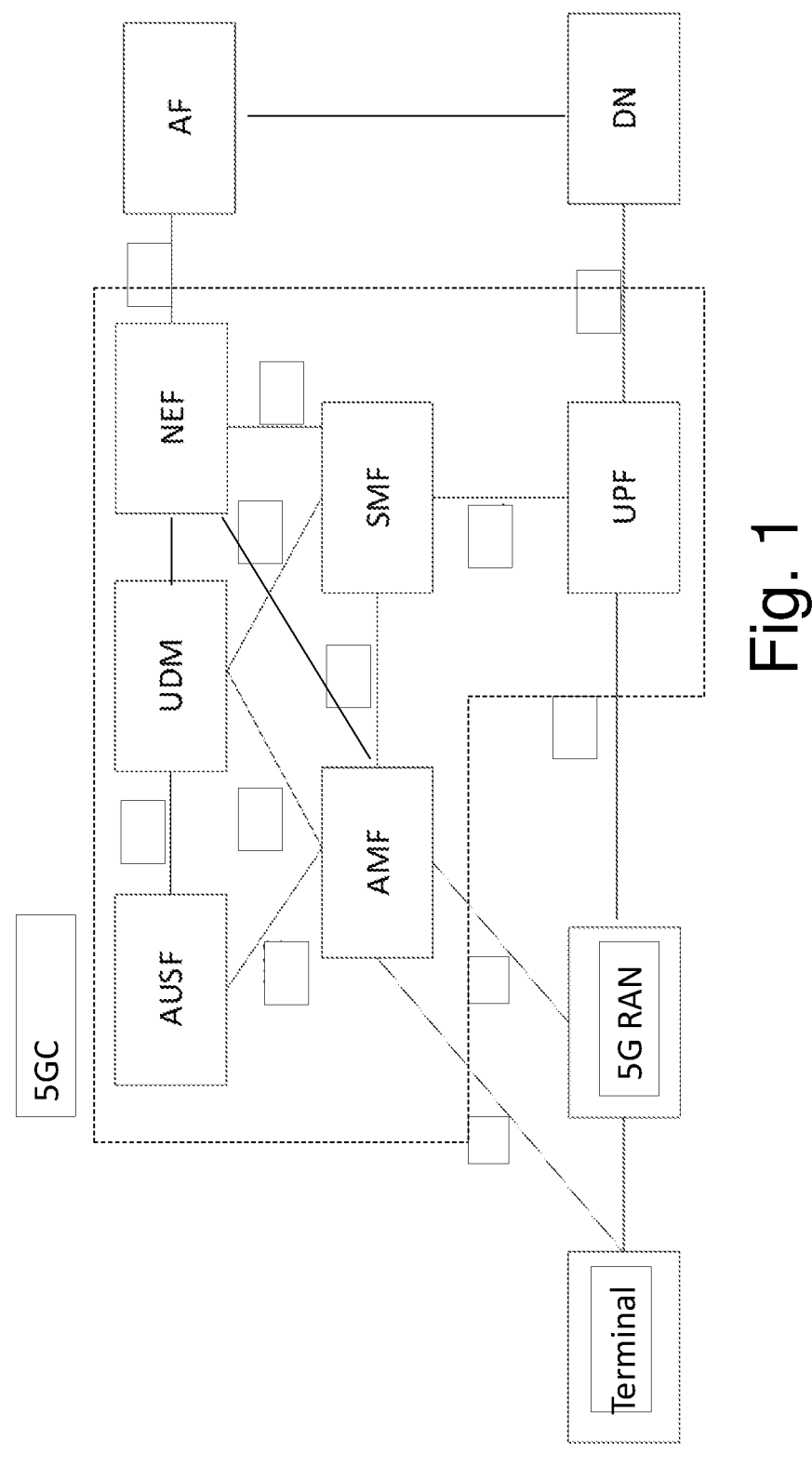
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB), one or more gNodeB (GNB) distributed unit functions connected to one or more gNodeB (GNB) centralized unit functions, or one or more next generation eNodeB (NGENB).

The 5GC may comprise for instance the following entities: Network Slice Selection Function (NSSF); Network Exposure Function (NEF); Network Repository Function (NRF); Policy Control Function (PCF); Unified Data Management (UDM); Application Function (AF); Authentication Server Function (AUSF); an Access and Mobility Management Function (AMF); and Session Management Function (SMF).

Access to the 5GC may be done more generally via a 5G access network (3G-AN), that can corresponding to a 3GPP access (e.g. NR or LTE access with a 5G-RAN) or a non-3GPP access (e.g. untrusted WLAN access via an N3IWF, trusted WLAN access via a TNGF, wirelines access via a W-AGF).

Figure 2:
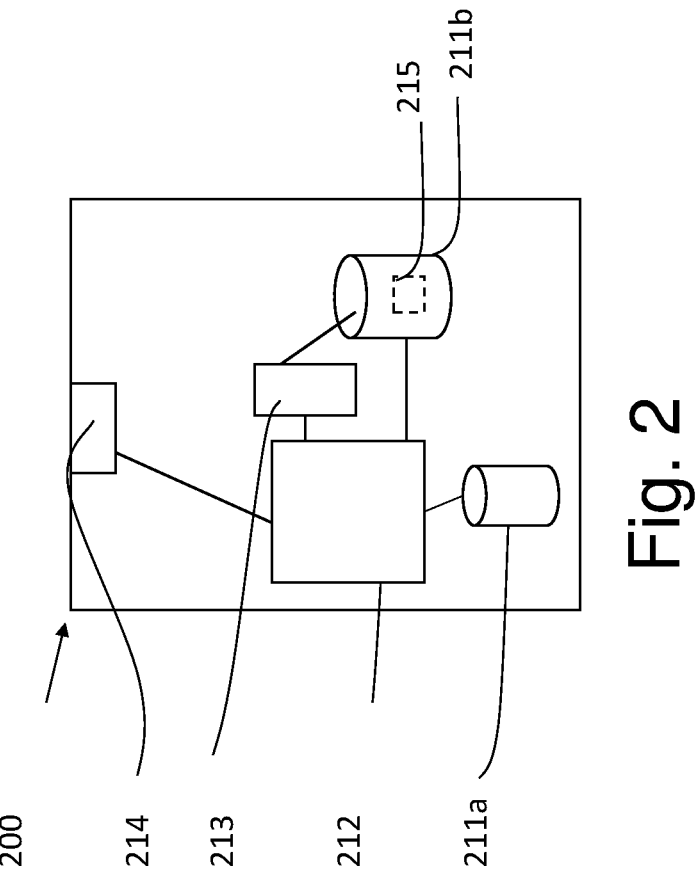
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
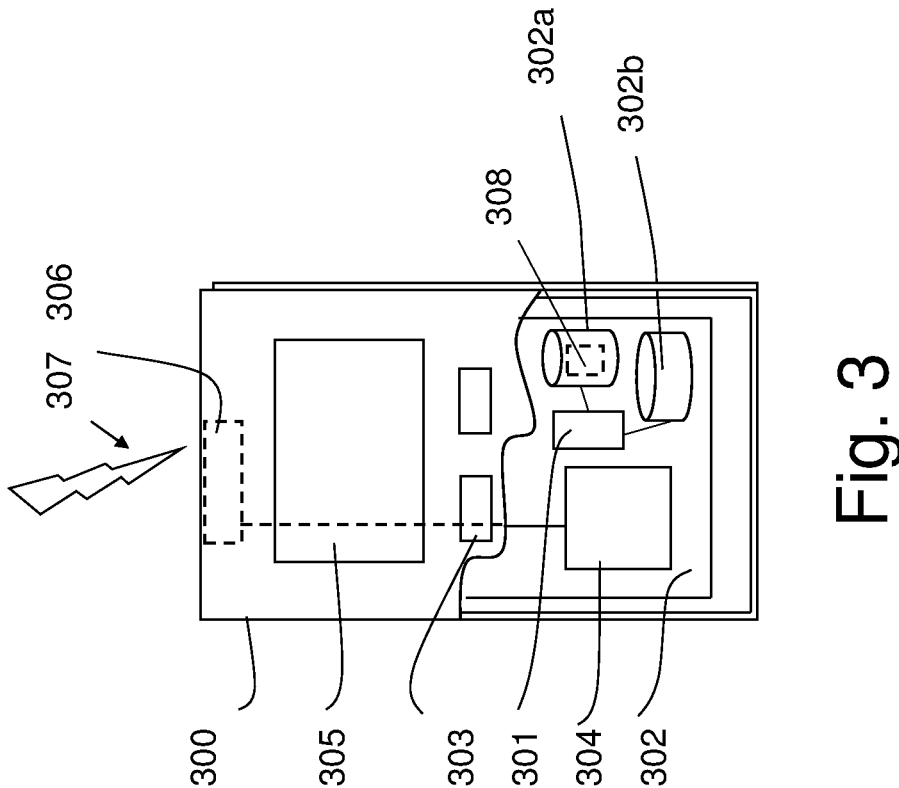
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 311a and the ROM 311b. The at least one processor 301 may be configured to execute an appropriate software code 308. The software code 308 may for example allow to perform one or more of the present aspects. The software code 308 may be stored in the ROM 311b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In some examples, communication between two entities may take place via a communication proxy. For example, a network function service consumer and a network function service provider may communicate via a service communication proxy (SCP) or security edge protection proxy (SEPP). Such communication may be termed "indirect communication".

Some example implementations of indirect communication shall now be discussed.

Figure 4A:
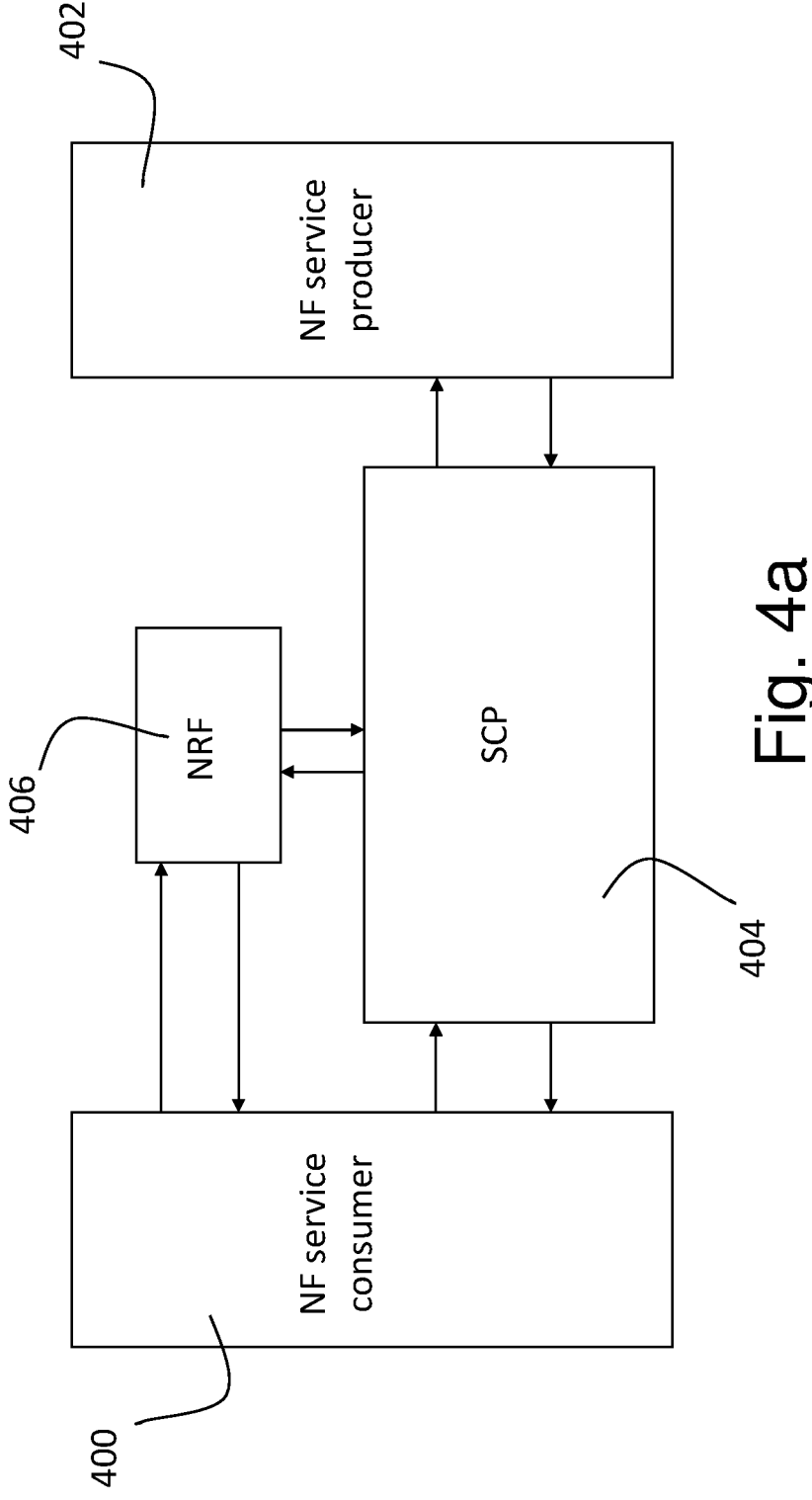
FIG. 4a shows a schematic representation of an example SCP deployment for indirect communication between a network function service consumer and a network function service producer.

Reference is made to FIG. 4a, which shows a schematic representation of an example SCP deployment for indirect communication between a network function service consumer and a network function service producer.

In the example of FIG. 4a, a network function service consumer 400 performs a discovery process by querying a NRF 406, and receives a response to the query. The discovery process may provide the network function service consumer with a list of possible network function service producers.

The network function service consumer then selects a network function service producer instance, or a set of network function service producers.

The network function service consumer 400 sends a service request to the SCP 404 containing the address of the network function service producer 402, or an identifier of the set of the network function service producers. Where a set of network function service producers is selected by the network function service consumer, the SCP may select a network function service producer instance from among the set.

The SCP may optionally interact with the NRF to obtain selection parameters such as location, capacity etc.

The SCP routes the request to the selected network function producer 402, based on the selection parameters, and subsequently routes a response from the network function producer 402 to the network function consumer 400.

Figure 4B:
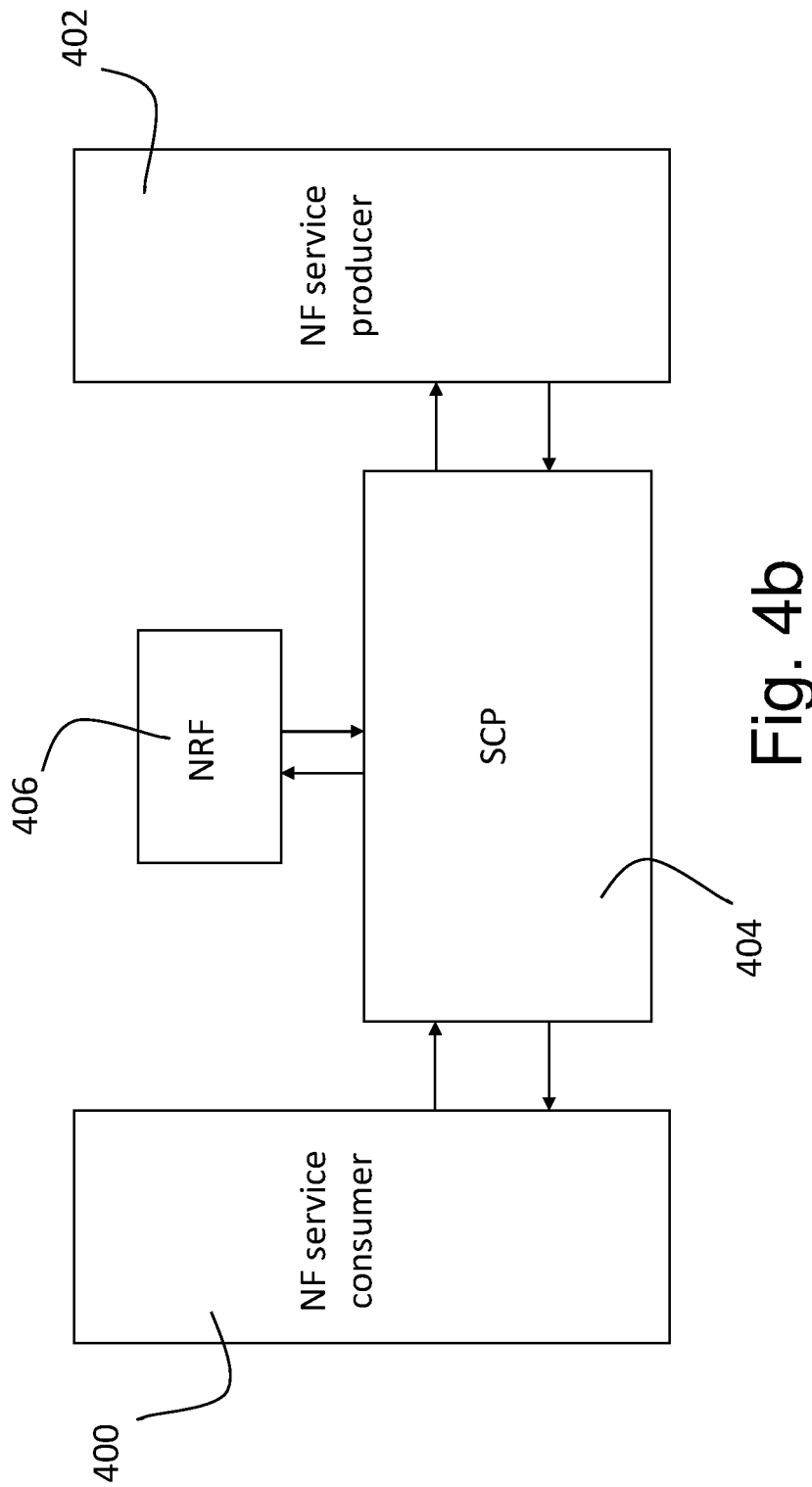
FIG. 4b shows a schematic representation of an example SCP deployment for indirect communication between a network function service consumer and a network function service producer.

Reference is made to FIG. 4b, which shows another example schematic representation of an example SCP deployment for indirect communication between a network function service consumer and a network function service producer.

In the example of FIG. 4b, the network function service consumer does not perform a discovery process by querying the NRF.

Instead, the network function service consumer 400 sends a service request to the SCP 404, where the service request comprises any necessary discovery and selection parameters required to find a suitable network function service producer to the service request.

The SCP 404 may use the discovery and selection parameters received in the service request to select a network function service producer 402. The SCP may perform a discovery process with the NRF 406, to determine the list of possible network function service producers.

The SCP may then route the service request to the selected network function service producer, and route a response from the network function service producer to the network function service consumer.

Figure 4C:
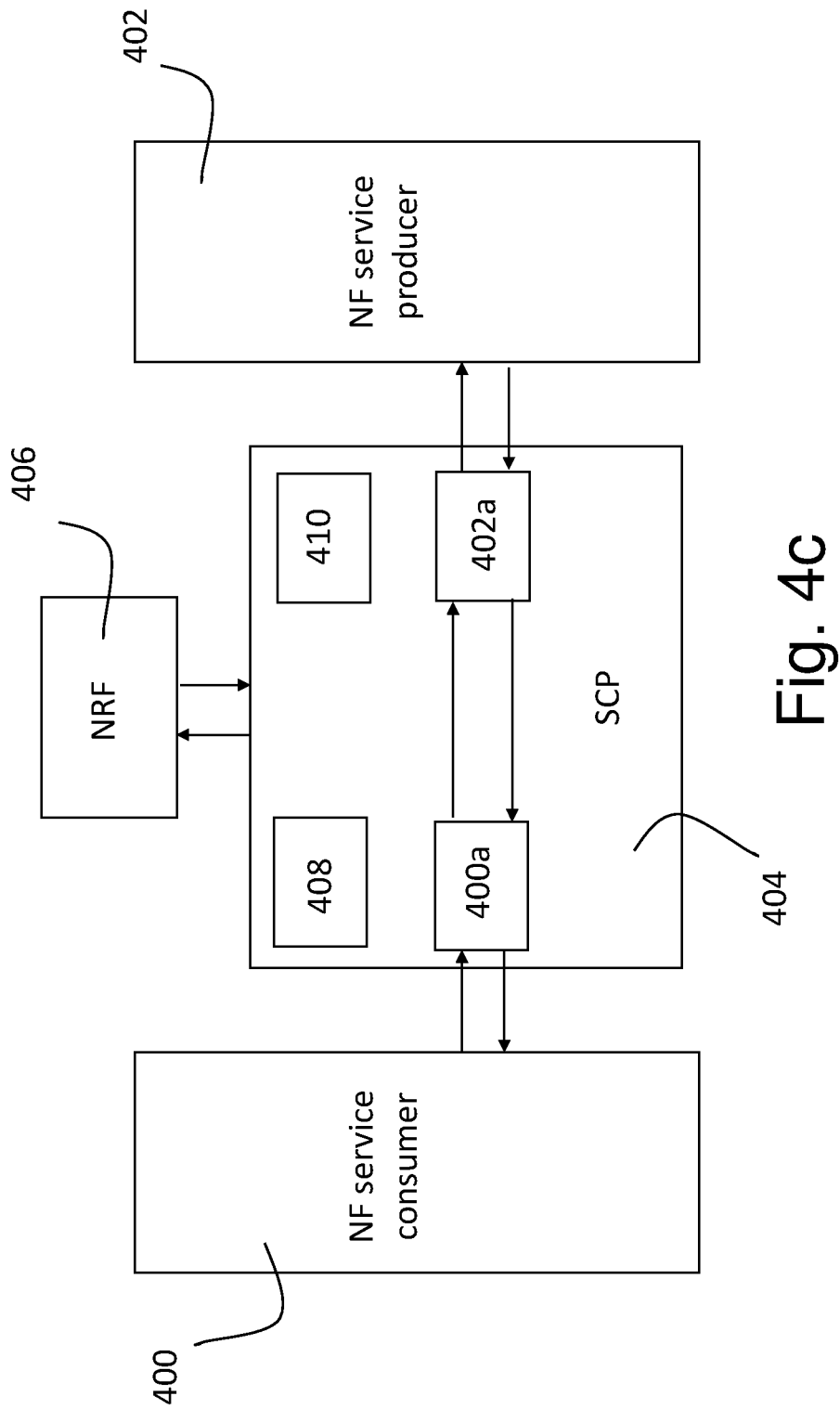
FIG. 4c shows a schematic representation of an example SCP deployment for indirect communication between a network function service consumer and a network function service producer.

Reference is made to FIG. 4c, which shows a schematic representation of an example SCP deployment for indirect communication between a network function service consumer and a network function service producer.

In FIG. 4c, the network function service consumer 400 communicates with the SCP 404 via an associated service agent 400a within the SCP 404. Similarly, the network function service producer 402 communicates with the SCP 404 via associated service agent 402a within the SCP 404.

The SCP may also comprise a controller 408, and optionally an internal service register 410.

During operation, the network function service consumer 400 may send a service request to its associated service agent 400a. Service agent 400a may select a target network function service producer 402 based on the request and route the request to service agent 402a associated with the selected network function service producer 402.

The routing of the request to the service agent of the selected network service function producer may be controlled by the SCP controller 408.

In some example implementations, the network function service consumer/producer may be provided in the same deployment unit as its associated service agent. The same SCP may serve one or more network function service consumers and/or one or more network function service producers.

Figure 4D:
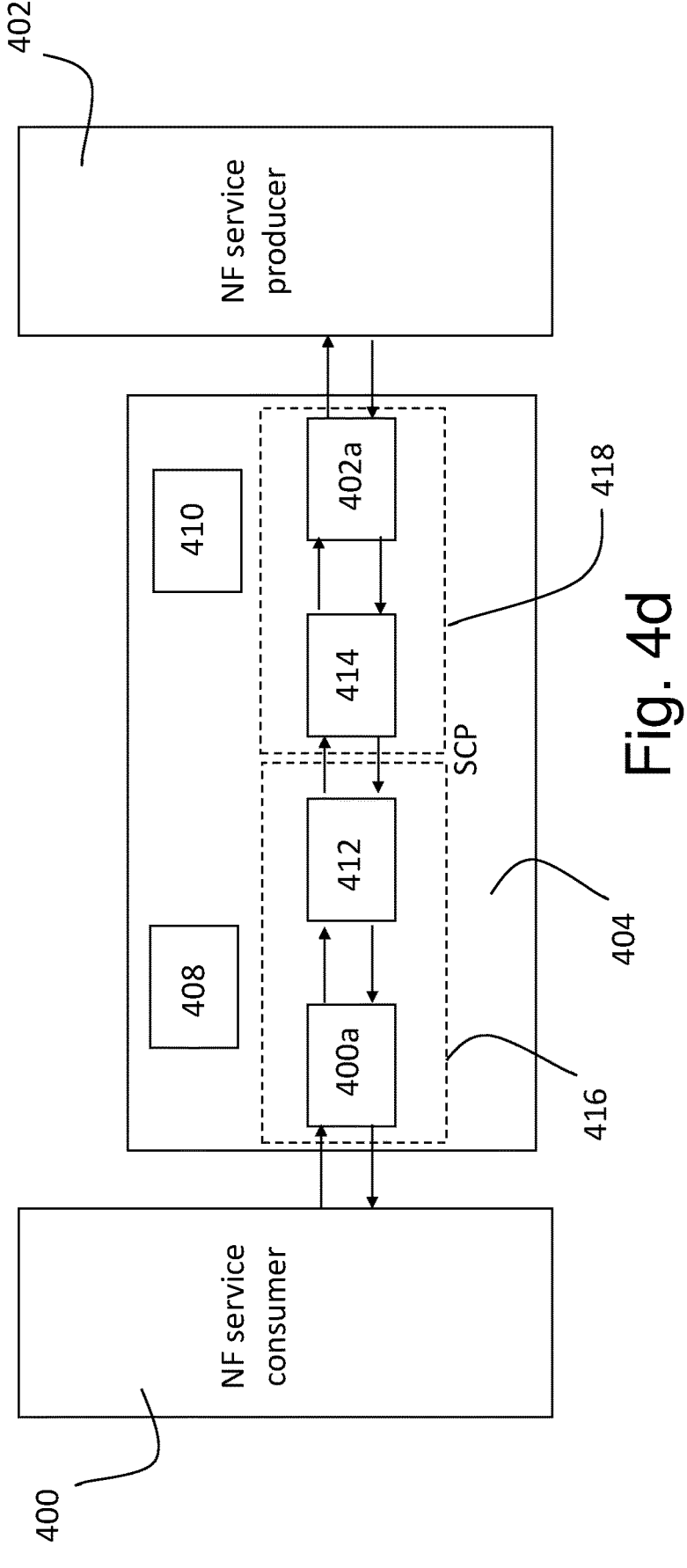
FIG. 4d shows a schematic representation of another example SCP deployment for indirect communication between a network function service consumer and a network function service producer.

Reference is made to FIG. 4d, which shows a schematic representation of another example SCP deployment for indirect communication.

In the example deployment of FIG. 4d, the SCP 404 comprises an egress proxy 412 and an ingress proxy 414. Service agent 400a and egress proxy 412 are comprised within a first service mesh 416, and service agent 402a and ingress proxy 414 are comprised in a second service mesh 418.

When network function service consumer 400 sends a service request to service agent 400a, it is determined that the request is for a network function service producer outside of the first service mesh 416.

The request is therefore routed from service agent 400a to egress proxy 412. To be able to successfully route the request, egress proxy 412 may have to determine the next hop of the request. In the example representation of FIG. 4d, this is ingress proxy 414 of the second service mesh 418. The egress proxy 412 of the first service mesh 416 may therefore route the service request to ingress proxy 414 of the second service mesh 418.

After receiving the service request from egress proxy 412, ingress proxy 414 may route the service request to the network function service producer 402 via its associated service agent 402a. The routing may be based on one or more routing and selection policies controlled by SCP controller 408. The routing and selection policies may, in some examples, be based on information received from a NRF (not shown in FIG. 4d), and/or information local to the SCP.

Figure 4E:
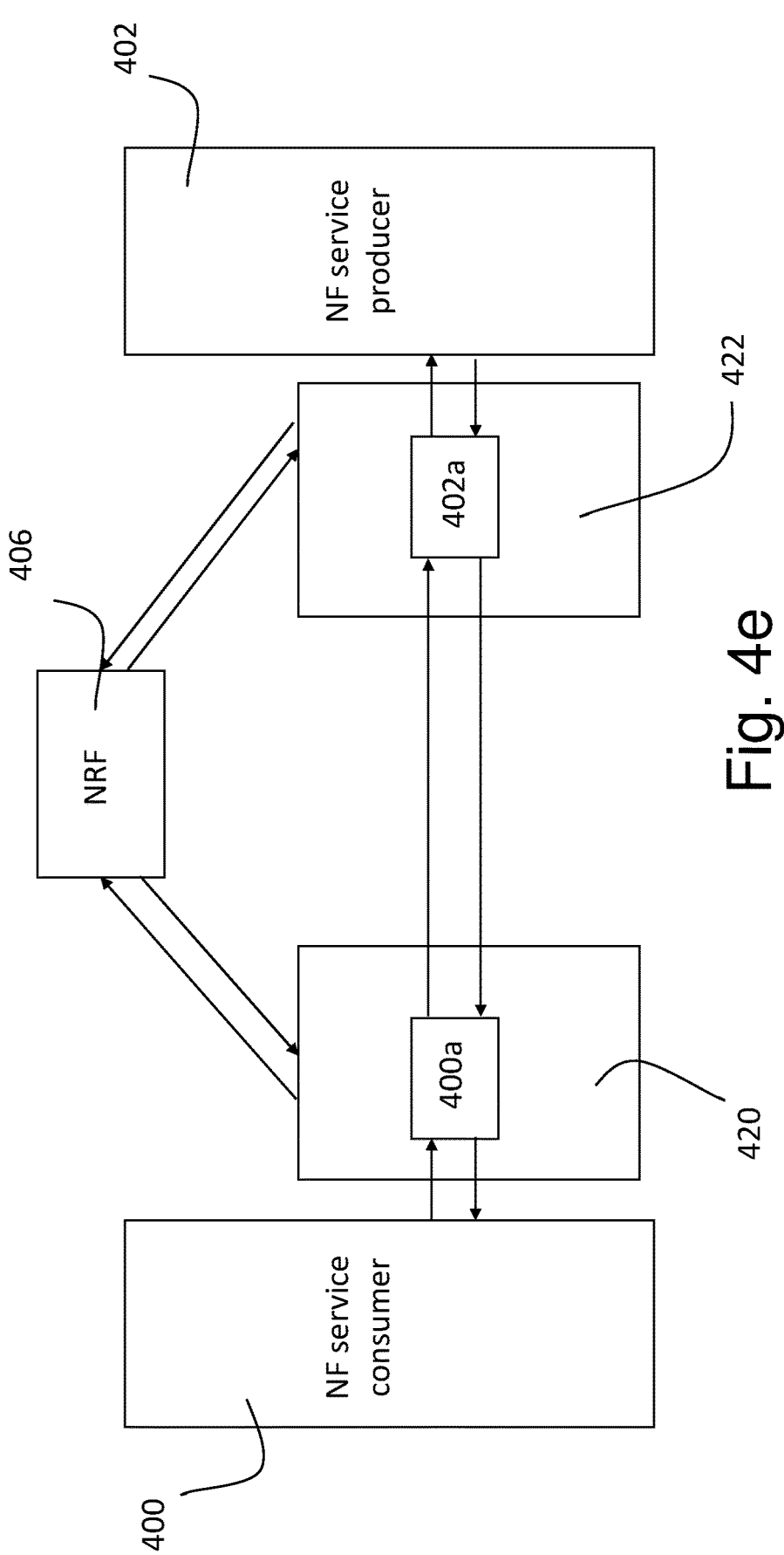
FIG. 4e shows a schematic representation of another example SCP deployment for indirect communication between a network function service consumer and a network function service producer.

Reference is made to FIG. 4e, which shows a schematic representation of another SCP deployment for indirect communication.

In the example of FIG. 4e, the network function service consumer 400 sends a service request to service agent 400a located in a first SCP 420, where the service requested is provided by a network function service producer 402 with its associated service agent 402a located in a second SCP 422.

In this example, the service request may be routed between the service agent 400a in the first SCP 420 and the service agent 402a located in the second SCP 422. Each of the first and second SCPs may comprise a controller and internal register as described previously in relation to FIGS. 4c and d, and each SCP may be in communication with a NRF 406 for network function discovery as described previously.

Thus, in some examples, an SCP may perform various functions, such as network function service producer discovery, selection, re-selection, routing etc.

While the above examples have been described with reference to an SCP, it should be understood that any suitable proxy may be used to perform the same function.

However, in the above described examples, the NF service consumer or the proxy may not necessarily be able to perform optimally, as it may be unaware of certain information relating to the network performance. For example, the NF service consumer or the proxy may be unable to perform load-balancing, as it may be unaware that a given network function service producer is operating under high demand, and as such the NF service consumer or the proxy may continue to select and route service requests to the given network function service producer, rather than an alternative network function service producer.

Furthermore, in the event that a service request is routed from a first proxy to a second proxy, the first proxy may be unaware of whether the second proxy is overloaded, or inoperable, for example due to a natural calamity. The first proxy may be unable to dynamically determine network topology and optimize service request routing.

For example, a network function service consumer may send a service request towards a first SCP. A defined network path may be as follows:

NF Service consumer>SCP1>SCP2>SEPP1>NF Service producer.

However, alternative routing paths may be available, such as:

NF Service consumer>SCP2>SEPP1>NF Service Producer

NF Service consumer>SCP2>SCP1>SEPP1>NF Service producer.

However, if NF service consumer, SCP1, SCP2, and/or SEPP1 are unaware of the overall network topology, they may be unable to select an optimal path for routing the service request from the NF consumer to the NF producer.

Some example embodiments may provide support for path selection information provided by a network function to assist in path selection and optimization for message routing.

Figure 5:
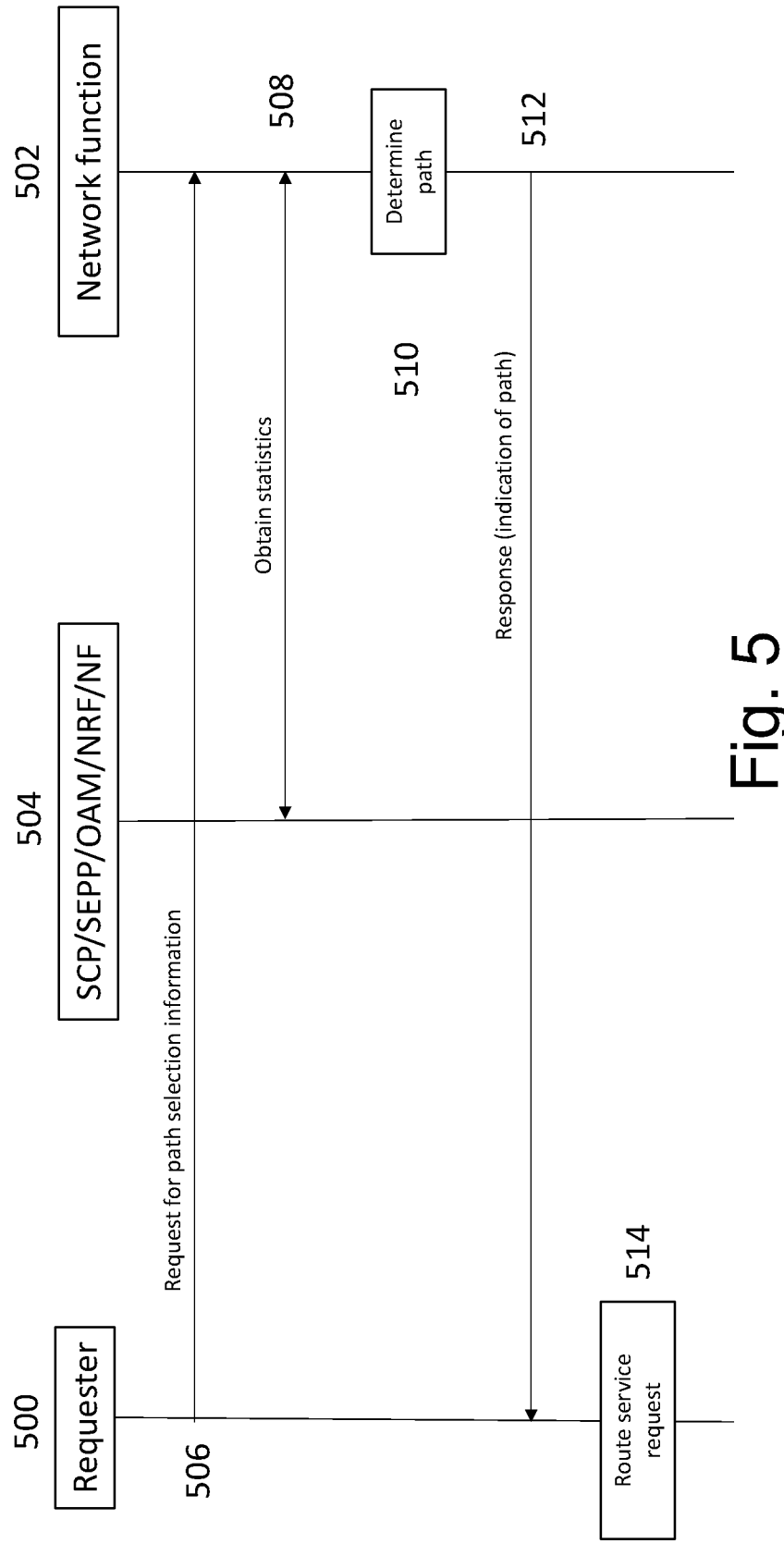
FIG. 5 shows a signalling flow according to an example embodiment.

Reference is made to FIG. 5, which shows a method according to some example embodiments.

At step 506, a requester of path selection information 500 may request path selection information from a network function 502 for providing a path between a first network entity and a second network entity.

The first network entity may comprise a network function service consumer, and the second network entity may comprise a network function service producer.

The requester of path selection information 500 may, in some example embodiments, be a proxy, such as an SCP or SEPP. In other embodiments, the requester of path selection information may be a Network function or NRF. The requester of path selection information may be an OAM.

The network function 502 may, in some example embodiments, be a network data analytics function (NWDAF).

The requester of path selection information 500 may provide, to the network function 502, one or more inputs for the network function to use when providing the path selection information. The one or more inputs may be provided by any suitable means, such as but not limited to, a service request/response API, or a subscribe/notify API etc.

The one or more inputs may comprise any of the following:

a PLMN identifier associated with the first and/or second network entity;

network function information, such as instance ID, set ID, network function type etc. associated with the first and/or second network entity; and information associated with at least one proxy in communication with the requester of path selection information.

At step 508, the network function 502 may obtain statistics relating to network performance from at least one other network entity 504 that the network function has a connection to (either directly or indirectly). The at least one other network entity may, for example, be a SCP, SEPP, OAM, NF or NRF. While only one other network entity is shown in FIG. 5, it should be understood that there may be more than one other network entity from which statistics are obtained.

In some example embodiments, the statistics relating to network performance provided by the at least one other network entity to the network function 502 may include any of the following:

a number of discovery and/or selection events performed by a said at least one other network entity;

a number of reselection events performed by said at least one other network entity—for example, reselection may be performed due to overload and/or failure of a given network function producer instance;

a number of times said at least one other network entity was unable to fulfil a service request for a given network function service producer;

error information, such as HTTP or communication errors received or generated by said at least one other network entity in the communications network;

load and overload metrics of network function service producers, which may be exchanged in HTTP signalling or measured by the respective SCP/SEPP; and at least one of average, minimum, and maximum response times.

In some example embodiments, the respective at least one other network entity is configured to collect the statistics relating to network performance, and subsequently store the statistics relating to network performance, at different granularities, such as per any of the following:

a network function service instance;

a network function service set;

a network function instance;

a network function set;

a network function type;

PLMN; and service mesh domain.

The at least one other network entity may use any suitable mechanism for providing the statistics relating to network performance to the network function 502, such as any of the following:

the statistics may be pushed to the network function;

the statistics may be reported to the network function when requested by the network function;

the statistics may be provided to the network function when the network function subscribes to the network entity;

the statistics may be published to a further entity (e.g. a messaging bus) allowing the network function to retrieve the statistics; and the statistics may be stored in a database (e.g. UDR), and the network function may retrieve the statistics from the database.

At step 510 the network function may determine a path. The path may be determined based on the obtained statistics.

The path may define a path for routing data between a first network entity and a second network entity. For example, a path may comprise one or more SCPs and/or one or more SEPPs for routing data between a network function service consumer and a network function service producer.

At step 512, the network function 502 may provide a response to the requester of path selection information 500. The response may comprise an indication of the determined path. If in step 506, request is sent via Subscribe request to 502, then the 502 can send continuous notifications to 500 with route updates. In this way, 500 is provided with latest updated or optimized route.

In some examples, a given path may be associated with a certain timing window. That is to say, for example, a first path may be associated with a first timing window, and a second path may be associated with a second timing window.

As such, in some example embodiments, the response may comprise more than one path and an associated indication of a timing window for each path.

In some example embodiments, the response may comprise an indication of a level of confidence that the analytics function has of the path being an optimum path.

At step 514, the requester of path selection information 500, upon receiving the response from the network function, may route a service request via the path indicated in the response.

Where the path is associated with a timing window, the requester of path selection information 500 may be configured to route the service request via the determined path during the associated timing window.

In some example embodiments, the network function 502, may obtain the statistics described previously. The network function 502 may provide the statistics or information obtained from the statistics to at least one further network entity. The at least one further network entity may, for example, be an SCP, SEPP, OAM, NF or NRF.

In some example embodiments, the at least one further network entity may comprise an NRF. The NRF may subscribe to the network function 502, and receive the statistics or information derived from the statistics, from the network function 502. In such example embodiments, the NRF may use the statistics to optimize service discovery response.

In some example embodiments, the at least one further network entity may comprise an operations and administration manager (OAM). The OAM may subscribe to the network function 502, and receive the statistics or information derived from the statistics, from the network function 502. The OAM may use the statistics or information derived from the statistics, to determine network reconfiguration actions, e.g. to trigger the setup of a new network slice or to scale-out an network function producers set and/or install additional producer instances.

In some example embodiments, the at least one further network entity may comprise a further network function. In such example embodiments, the further network function may use the statistics or information derived from the statistics, when selecting a NF service producer. The further network function may use the statistics or information derived from the statistics, when selecting NF service producers set, in scenarios where it selects an NF service producer instance or NF service producer set.

In some example embodiments, the network function 502 may be configured to push the statistics or information derived from the statistics, to the at least one further network entity. In some example embodiments, the at least one further network entity may subscribe to the network function 502, such that when the network function 502 publishes the statistics, the at least one further network entity receives the statistics.

In some example embodiments, the network function may determine a change in network behaviour. For example, the network function may determine that a given SCP/SEPP/NF is down or inactive, or that traffic needs to be routed via another path other than a previously determined path. The network function may determine an updated path, and provide a further output indicating updated path selection information to the requester of path selection information.

A method may comprise receiving at at least one entity in a communications network (e.g., SCP, SEPP, NF or NRF), a request from a network function to provide the statistics relating to network performance, or a request to subscribe to be notified about changes of statistics relating to network performance and providing to the network function statistics relating to network performance in the response or notifying the network function about changes of statistics relating to network performance in subsequent notifications.

Thus, in some example embodiments, statistics collected by a network entity, such as a SCP/SEPP/OAM/NRF/NF, may be used by the network function 502 for dimensioning the network, and to optimize network behaviour. For example, if a given SCP/SEPP has to perform reselection and/or rerouting many times within a given duration due to overload and failure of a given network function producer, the network operator can easily determine that additional network function producer instances are required and/or deploy new network slices. The NRF may also use the collected statistics to improve network function service discovery request responses, and return alternative network function service producers.

Some example embodiments may also optimize data/ message delivery in the network. Network failure and/or network function path failure or overload may be detected by the network function 502, and SCP/SEPP may be instructed to route messages accordingly. Furthermore, during natural calamities, the analytics function can optimize the message delivery path.

Some example embodiments may also assist in performing load balancing within the network, as the network function 502 may predict a particular path to have less load at a certain time interval, and instruct SCP/SEPP/NF to select the particular path during that certain time interval.

In some example embodiments, there is provided an apparatus comprising means for receiving, at a network function from a requester of path selection information in a communications network, a request for path selection information between a first network entity and a second network entity in the communications network, determining a path between a first network entity and a second network entity and providing an indication to the requester of path selection information of the determined path.

Alternatively or in addition, there is provided an apparatus comprising means for providing, from a requester of path selection information in a communications network to a network function, a request for path selection information between a first network entity and a second network entity in the communications network, receiving, from the network function, an indication of a path between the first network entity and the second network entity and routing service requests between the first network entity and the second network entity based on the received indication.

Alternatively, or in addition, there is provided an apparatus comprising means for obtaining, from at least one network entity in the communications network, statistics relating to network performance and providing the statistics or information derived from the statistics to at least one further network entity in the communications network.

Alternatively, or in addition, there is provided an apparatus comprising means for receiving, from a network function, statistics or information derived from statistics relating to network performance; and at least one of: performing a network entity discovery process based, at least in part, on the received statistics relating to network performance, determining network reconfiguration actions based on the received statistics relating to network performance and selecting a network function service producer based on the received statistics relating to network performance.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus, comprising:
at least one processor; and
at least one memory including computer program code, the at least one memory and computer program code configured to, with the at least one processor, cause the apparatus at least to:
receive, at a network function from a requester of path selection information in a communications network, a request for path selection information between a first network entity and a second network entity in the communications network;
determine a control plane service based interface messaging path between a first network entity and a second network entity via one or more proxies comprising at least one of a service communication proxy and a security edge protection proxy; and
provide an indication to the requester of path selection information of the determined path,
wherein the first network entity comprises a network function service consumer, and the second network entity comprises a network function service producer, or wherein the first network entity comprises a network function service producer, and the second network entity comprises a network function service consumer,
wherein the at least one memory and computer program code, when executed by the at least one processor, further cause the apparatus to perform:
obtaining, from at least one other network entity in the communications network, statistics relating to network performance from at least one of a service communication proxy, a security edge protection proxy, a network repository function, an operations and administration manager, and a network function,
wherein the path is determined based on the statistics relating to network performance and wherein the statistics include at least: (i) load and overload metrics of network function service producers; and (ii) a number of times an entity was unable to fulfill a service request for a given network function service producer.

2. The apparatus of claim 1, wherein the requester of path selection information is one of:
a security edge protection proxy;
and
an operations and administration manager.

3. The apparatus of claim 1, wherein the request comprises:
a public land mobile network identifier associated with at least one of the first and second network entities;
network function information associated with at least one of the first and second network entities; and
information associated with at least one proxy in communication with the requester of path selection information.

4. The apparatus of claim 1, wherein the statistics relating to network performance comprise:
a number of discovery and selection events performed by said at least one other network entity in the communications network;
a number of reselection events performed by said at least one other network entity in the communications network;
a number of times said at least one other network entity was unable to fulfill a service request for a given network function service producer;
error information received or generated by said at least one other network entity in the communications network;
load and overload metrics of network function service producers; and
average, minimum, and maximum response times.

5. The apparatus claim 1, wherein the statistics relating to network performance are obtained per:
public land mobile network; and
service mesh domain.

6. The apparatus of claim 1, wherein the determined path is associated with a timing window, and wherein the at least one memory and computer program code, when executed by the at least one processor, further cause the apparatus to perform providing an indication of the timing window to the requester of path selection information.

7. The apparatus of claim 1, wherein the at least one memory and computer program code, when executed by the at least one processor, further cause the apparatus to perform:
determining a change in network behavior;
determining an updated path between the first network entity and the second network entity; and
providing an indication to the requester of path selection information of updated path selection information.

8. The apparatus of claim 1, wherein the indication of the determined control-plane service-based interface messaging path is further provided to:
an operations and administration manager;
and
a security edge protection proxy.

9. The apparatus of claim 1, wherein said at least one other network entity in the communications network is one of:
a service communication proxy.

10. An apparatus, comprising:
at least one processor; and
at least one memory including computer program code, the at least one memory and computer program code configured to, with the at least one processor, cause the apparatus at least to:
obtain, from at least one network entity in the communications network, statistics relating to network performance from at least one of a service communication proxy, a security edge protection proxy, a network repository function, an operations and administration manager, and a network function, the statistics comprising operational statistics exchanged in HTTP signaling or measured by said service communication proxy or security edge protection proxy, and provided via at least one of pushing, reporting when requested, providing when a subscription is in place, publishing, or enabling retrieval from a database; and provide the statistics or information derived from the statistics to at least one further network entity in the communications network, wherein the at least one memory and computer program code, when executed by the at least one processor, further cause the apparatus to perform:

receiving a request for the statistics or information derived from the statistics relating to network performance; and wherein the providing the statistics or information derived from the statistics is performed responsive to the receiving.

11. The apparatus of claim 10, wherein the at least one memory and computer program code, when executed by the at least one processor, further cause the apparatus to perform:

Receiving, at at least one entity in a communications network, a request from a network function to provide the statistics relating to network performance, or a request to subscribe to notifications about changes of statistics relating to network performance; and providing to the network function statistics relating to network performance in the response or notifying the network function about changes of statistics relating to network performance in subsequent notifications.

12. A method comprising:

receiving, at a network function from a requester of path selection information in a communications network, a request for path selection information between a first network entity and a second network entity in the communications network;

determining a control plane service based interface messaging path between a first network entity and a second network entity via at least one of a service communication proxy and a security edge protection proxy based on statistics relating to network performance obtained from at least one of a service communication proxy, a security edge protection proxy, a network repository function, an operations and administration manager, and a network function, the statistics including at least producer load and overload metrics and a number of times an entity was unable to fulfill a service request for a given network function service producer; and providing an indication to the requester of path selection information of the determined path.

13. A method comprising:

providing, from a requester of path selection information in a communications network to a network function, a request for path selection information between a first network entity and a second network entity in the communications network;

receiving, from the network function, an indication of a control plane service based interface messaging path via at least one of a service communication proxy and a security edge protection proxy between the first network entity and the second network entity; and routing service requests comprising service based interface control plane messaging between the first network entity and the second network entity based on the received indication.

14. A method comprising:

obtaining, from at least one network entity in the communications network, statistics relating to network performance from at least one of a service communication proxy, a security edge protection proxy, a network repository function, an operations and administration manager, and a network function, the statistics comprising operational statistics exchanged in HTTP signaling or measured by said service communication proxy or security edge protection proxy, and provided via at least one of pushing, reporting when requested, providing when a subscription is in place, publishing, or enabling retrieval from a database;

providing the statistics or information derived from the statistics to at least one further network entity in the communications network, the method further comprising:

receiving a request for the statistics or information derived from the statistics relating to network performance; and wherein the providing the statistics or information derived from the statistics is performed responsive to the receiving.

15. A method comprising:

receiving, from a network function, statistics or information derived from statistics relating to network performance;

performing a network entity discovery process based, at least in part, on the received statistics relating to network performance;

determining network reconfiguration actions based on the received statistics relating to network performance; and selecting a network function service producer based on the received statistics relating to network performance.

16. The apparatus of claim 1, wherein the indication of the control plane service based interface messaging path comprises: (i) an ordered list of intermediate proxies; (ii) an associated timing window; and (iii) a confidence indication, and wherein the at least one memory and computer program code, when executed by the at least one processor, further cause the apparatus to perform providing updated path selection information responsive to determining a change in network behavior.

17. An apparatus, comprising:

at least one processor; and at least one memory including computer program code, the at least one memory and computer program code configured to, with the at least one processor, cause the apparatus at least to:

provide, from a requester of path selection information in a communications network to a network function, a request for path selection information between a first network entity and a second network entity in the communications network;

receive, from the network function, an indication of a control plane service based interface messaging path via at least one of a service communication proxy and a security edge protection proxy between the first network entity and the second network entity; and route service requests comprising service based interface control plane messaging between the first network entity and the second network entity based on the received indication.

18. The apparatus of claim 10, wherein the statistics are stored and aggregated per public land mobile network and per service mesh domain, and comprise at least: a number of discovery and selection events, a number of reselection events, a number of times an entity was unable to fulfill a service request for a given network function service producer, error information, load and overload metrics of network function service producers, and average, minimum, and maximum response times, and wherein providing the statistics or information derived therefrom comprises at least one of: pushing, reporting when requested, providing when a network function subscribes to be notified, publishing, or enabling retrieval from a database.

19. An apparatus, comprising:
   at least one processor; and
      at least one memory including computer program code, the at least one memory and computer program code configured to, with the at least one processor, cause the apparatus at least to:
   receive, from a network function, statistics or information derived from statistics relating to network performance;
   perform a network entity discovery process based, at least in part, on the received statistics relating to network performance;

determine network reconfiguration actions based on the received statistics relating to network performance; and
   select a network function service producer based on the received statistics relating to network performance.

20. A non-transitory computer-readable medium comprising program instructions for causing an apparatus to perform at least the method of claim 12.

21. A non-transitory computer-readable medium comprising program instructions for causing an apparatus to perform at least the method of claim 13.

22. A non-transitory computer-readable medium comprising program instructions for causing an apparatus to perform at least the method of claim 14.

23. A non-transitory computer-readable medium comprising program instructions for causing an apparatus to perform at least the method of claim 15.

* * * * *